United States Patent
Chakravarty et al.

(10) Patent No.: US 9,773,059 B2
(45) Date of Patent: Sep. 26, 2017

(54) TAPE DATA MANAGEMENT

(75) Inventors: Tridib Chakravarty, Irvine, CA (US); Suman Grandhi, Irvine, CA (US); Daniel Bright, Irvine, CA (US)

(73) Assignee: STORAGEDNA, INC., Irvine, CA (US)

( * ) Notice: Subject to any disclaimer, the term of this patent is extended or adjusted under 35 U.S.C. 154(b) by 756 days.

(21) Appl. No.: 13/293,066

(22) Filed: Nov. 9, 2011

(65) Prior Publication Data

US 2012/0179867 A1    Jul. 12, 2012

Related U.S. Application Data

(60) Provisional application No. 61/411,816, filed on Nov. 9, 2010.

(51) Int. Cl.
*G06F 12/00* (2006.01)
*G06F 13/00* (2006.01)
(Continued)

(52) U.S. Cl.
CPC ...... *G06F 17/30858* (2013.01); *G11B 27/107* (2013.01); *G11B 27/322* (2013.01);
(Continued)

(58) Field of Classification Search
CPC ........ G06F 3/06; G06F 3/0601; G06F 3/0628; G06F 3/0638; G06F 3/0643; G06F 3/0668; G06F 3/0671; G06F 3/0673; G06F 3/0682; G06F 17/30; G06F 17/30067; G06F 17/30781; G06F 17/30858; G11B 20/1201; G11B 27/10; G11B 27/102; G11B 27/107; G11B 27/19; G11B 27/22; G11B 27/28; G11B 27/30; G11B 27/322; G11B 27/327; G11B 27/328; G11B 27/329; H04N 21/20; H04N 21/23; H04N 21/231; H04N 21/232; H04N 21/241
(Continued)

(56) References Cited

U.S. PATENT DOCUMENTS 4,792,898 A * 12/1988 McCarthy et al. ........... 711/118
5,778,395 A *  7/1998 Whiting et al.
(Continued)

FOREIGN PATENT DOCUMENTS

WO    WO 2010/047679 A1 *  4/2010   ............. G11B 5/008

OTHER PUBLICATIONS

1 Beyond QuadArchiver, 1 Beyond, copyright 2005, retrieved from http://www.hgsitebuilder.com/files/writeable/uploads/hostgator762880/file/1_beyond_quadarchiver4-3-13.pdf (2 pages).*

(Continued)

*Primary Examiner* — Daniel C Chappell
(74) *Attorney, Agent, or Firm* — Klein, O'Neill & Singh, LLP

(57) ABSTRACT

Systems and methods for managing data with respect to tape storage are provided. The system includes a data manager for receiving metadata related to content and for generating a proxy file system which mirrors the data structure of the content data. The system further includes a server coupled to a tape device, the server receiving the content data directly from a data source and providing the content data the tape device for storage on a formatted tape media.

12 Claims, 13 Drawing Sheets

(51) Int. Cl.
  *G06F 13/28* (2006.01)
  *G06F 17/30* (2006.01)
  *G11B 27/10* (2006.01)
  *G11B 27/32* (2006.01)
  *G06F 3/06* (2006.01)
  *H04N 21/231* (2011.01)

(52) U.S. Cl.
  CPC .......... *G11B 27/329* (2013.01); *G06F 3/0643* (2013.01); *G06F 3/0682* (2013.01); *H04N 21/231* (2013.01)

(58) Field of Classification Search
  USPC .......................................................... 711/111
  See application file for complete search history.

(56) References Cited

U.S. PATENT DOCUMENTS

| | | | | |
|---|---|---|---|---|
| 5,852,435 | A * | 12/1998 | Vigneaux .......... | G06F 17/30017 345/428 |
| 5,950,218 | A * | 9/1999 | Howard ............. | 711/4 |
| 6,108,759 | A * | 8/2000 | Orcutt et al. ........ | 711/173 |
| 6,301,067 | B1 * | 10/2001 | Takayama .......... | 360/48 |
| 6,360,234 | B2 * | 3/2002 | Jain et al. ........... | 715/201 |
| 6,701,450 | B1 * | 3/2004 | Gold ................... | G06F 11/1417 711/162 |
| 6,816,941 | B1 * | 11/2004 | Carlson .............. | G06F 3/0607 711/111 |
| 7,159,139 | B2 * | 1/2007 | Vishlitzky et al. ... | 714/6.12 |
| 7,286,749 | B2 * | 10/2007 | Shiiyama ............ | G11B 27/005 348/E7.054 |
| 7,460,149 | B1 * | 12/2008 | Donovan et al. .... | 348/143 |
| 7,587,419 | B2 * | 9/2009 | Thorpe ................ | G06F 17/30817 |
| 7,698,517 | B2 * | 4/2010 | Tulyani .............. | 711/161 |
| 7,796,856 | B2 * | 9/2010 | Shinkai ............... | 369/47.13 |
| 8,006,111 | B1 * | 8/2011 | Faibish et al. ....... | 713/324 |
| 8,392,705 | B2 * | 3/2013 | Borden et al. ....... | 713/165 |
| 8,799,226 | B2 * | 8/2014 | Haselton et al. .... | 707/654 |
| 8,935,470 | B1 * | 1/2015 | Fair ..................... | 711/113 |
| 8,954,663 | B1 * | 2/2015 | Klein et al. .......... | 711/111 |
| 9,063,666 | B2 * | 6/2015 | Amir et al. | |
| 9,324,379 | B2 * | 4/2016 | Lee ...................... | G11B 27/28 |
| 9,349,413 | B2 * | 5/2016 | McIntosh ............ | G11B 27/105 |
| 9,467,750 | B2 * | 10/2016 | Banica ................ | H04N 21/812 |
| 2002/0067500 | A1 * | 6/2002 | Yokomizo et al. .... | 358/1.15 |
| 2002/0107877 | A1 * | 8/2002 | Whiting et al. ...... | 707/204 |
| 2002/0124137 | A1 * | 9/2002 | Ulrich et al. ......... | 711/113 |
| 2003/0158873 | A1 * | 8/2003 | Sawdon et al. ...... | 707/204 |
| 2003/0235000 | A1 * | 12/2003 | Takayama ........... | 360/69 |
| 2004/0073624 | A1 * | 4/2004 | Dewey ................ | 709/213 |
| 2004/0177319 | A1 * | 9/2004 | Horn .................... | 715/501.1 |
| 2004/0255329 | A1 * | 12/2004 | Compton et al. .... | 725/109 |
| 2005/0008327 | A1 * | 1/2005 | Shinkai ............... | G11B 27/031 386/283 |
| 2005/0050263 | A1 * | 3/2005 | Ashton et al. ....... | 711/111 |
| 2005/0071624 | A1 * | 3/2005 | Rothman ............. | G06F 9/4406 713/100 |
| 2005/0099963 | A1 * | 5/2005 | Multer ................. | G06F 17/30174 370/254 |
| 2005/0120168 | A1 * | 6/2005 | Vishlitzky et al. ... | 711/112 |
| 2005/0147129 | A1 * | 7/2005 | Maehara et al. ..... | 370/486 |
| 2005/0188248 | A1 * | 8/2005 | O'Brien et al. ...... | 714/5 |
| 2005/0246373 | A1 * | 11/2005 | Faulkner et al. ..... | 707/104.1 |
| 2006/0101084 | A1 * | 5/2006 | Kishi et al. .......... | 707/200 |
| 2006/0176602 | A1 * | 8/2006 | Honjo et al. ......... | 360/69 |
| 2007/0217763 | A1 * | 9/2007 | Siemens et al. ..... | 386/112 |
| 2007/0260643 | A1 * | 11/2007 | Borden et al. ....... | 707/201 |
| 2008/0063287 | A1 * | 3/2008 | Klamer et al. ...... | 382/232 |
| 2008/0288869 | A1 * | 11/2008 | Ubillos ................ | G06F 17/30265 715/716 |
| 2010/0027961 | A1 * | 2/2010 | Gentile et al. ....... | 386/52 |
| 2010/0088579 | A1 * | 4/2010 | Hafner ................ | G06F 11/1076 714/807 |
| 2010/0241770 | A1 * | 9/2010 | Tumblin et al. ..... | 710/52 |
| 2011/0185149 | A1 * | 7/2011 | Gruhl et al. ......... | 711/206 |
| 2011/0199703 | A1 * | 8/2011 | Hansen et al. ...... | 360/77.12 |
| 2011/0238716 | A1 * | 9/2011 | Amir et al. .......... | 707/823 |
| 2011/0238906 | A1 * | 9/2011 | Amir et al. .......... | 711/111 |
| 2012/0030408 | A1 * | 2/2012 | Flynn et al. ......... | 711/102 |
| 2012/0078852 | A1 * | 3/2012 | Haselton et al. .... | 707/654 |
| 2012/0079191 | A1 * | 3/2012 | Jaquette ............... | 711/114 |
| 2012/0106309 | A1 * | 5/2012 | Oishi ................... | 369/53.44 |
| 2012/0300330 | A1 * | 11/2012 | Martin ................. | 360/48 |
| 2013/0339320 | A1 * | 12/2013 | Noda ................... | 707/692 |
| 2015/0116859 | A1 * | 4/2015 | Itagaki et al. ....... | 360/49 |
| 2016/0165173 | A1 * | 6/2016 | Lesh .................... | H04N 5/783 386/241 |
| 2017/0004859 | A1 * | 1/2017 | Charumilind ........ | G06F 3/0482 |

OTHER PUBLICATIONS

Definition of copyright notice, U.S. Copyright Office, retrieved from http://www.copyright.gov/help/faq/faq-definitions.html on Oct. 15, 2013 (2 pages).*

Definition of filename, Google Define, retrieved from https://www.google.com/search?q=define%3A+filename&oq=define%3A+filename&aqs=chrome.0.57j58.386693&sugexp=chrome,mod=0&sourceid=chrome&ie=UTF-8 on Oct. 15, 2013 (1 page).*

Definition of new, Merriam-Webster Dictionary, retrieved from http://www.merriam-webster.com/dictionary/new on Oct. 15, 2013 (1 page).*

What is LTFS?, George Crump, May 18, 2010, retrieved from http://www.storage-switzerland.com/articles/Entries/2010/5/18_What_is_LTFS.html on Dec. 29, 2014 (3 pages).*

A Visual Guide to Version Control, BetterExplained, Sep. 27, 2007, retrieved from http://betterexplained.com/articles/a-visual-guide-to-version-control/ (11 pages).*

Focus Proxsys Reference Manual, Focus enhancements, Aug. 2006, retrieved from http://www.manualslib.com/manual/239743/Focus-Proxsys.html on Jun. 30, 2015 (8 pages).*

Data Interchange on 12,7 mm 384-Track Magnetic Tape Cartridges—Ultrium-1 Format, Jun. 2001, retrieved from http://www.ecma-international.org/publications/files/ECMA-ST/Ecma-319.pdf on Jun. 30, 2015 (160 pages).*

What is LFTS?, George Crump, May 18, 2010, retrieved from http://www.storage-switzerland.com/Articles/Entries/2010/5/18_What_is_LTFS.html on Jul. 1, 2015 (2 pages).*

Proxy Video—From A to iPOD, Suny Behar, Panasonic, Sep. 2008, retrieved from ftp://ftp.panasonic.com/pub/panasonic/drivers/PBTS/papers/Proxy_Video_Final.pdf (17 pages).*

Focus Proxsys Reference Manual, Focus enhancements, Aug. 2006, retrieved from http://www.manualslib.com/manual/239743/Focus.Proxsys-html on May 30, 2015 (8 pages).*

Definition of: magnetic tape; PCMag; retrieved from http://www.pcmag.com/encyclopedia/term/46499/magnetic-tape on Apr. 7, 2016 (2 pages).*

Data Interchange on 12,7 mm 384-Track Magnetic Tape Cartidges—Ultrium-1 Format, Jun. 2001, retrieved from http://www.international.org/publications/files/ECMA-ST/Ecma-319.pdf on Jun. 30, 2015 (160 pages).*

What is LTFS?, George Crump, May 18, 2010, retrieved from http://www.storage-switzerland.com/Articles/Entries/2010/5/18_What_is_LTFS.html on Jul. 1, 2015 (3 pages).*

LTO-5 Breathes New Life into Tape Storage, Drew Robb, Jan. 22, 2010, retrieved from http://www.enterprisestorageforum.com/continuity/features/article.php/3860261/LTO-5-Breathes-New-Life-into-Tape-Storage.htm on Jul. 1, 2015 (5 pages).*

Hitachi TagmaStore® Adaptable Modular Storage and Workgroup Modular Storage Architecture Guide, Aug. 2006, retrieved from https://www.hds.com/assets/pdf/tagmastore-adaptable-modular-storage-and-workgroup-modular-storage-architecture-guide.pdf on Jul. 1, 2015 (85 pages).*

Introduction to XML, W3 Schools, Feb. 21, 2005, retrieved from https://web.archive.org/web/20050221002855/http://www.w3schools.com/xml/xml_whatis.asp on Dec. 29, 2014 (2 pages).*

(56) References Cited

OTHER PUBLICATIONS

Proxy Video—From A to iPOD, Suny Behar. Panasonic, Sep. 2008, retrieved from ftp://ftp.panasonic.com/pub/panasonic/drivers/PBTS/papers/Proxy_Video_Final.pdf (17 pages).*
A file system for VM-TOTAL/APL; Mann, R. Bruce; Proceedings of the international conference on APL ; Apr. 10-13, 1983; pp. 97-102 (6 pages).*
File-based media workflows using ltfs tapes; Amir et al; Proceedings of the 18th ACM international conference on Multimedia; Oct. 25-29, 2010; pp. 1519-1520 (2 pages).*

* cited by examiner

| Clip 1 |
|---|

1aa.ext        12/12/09   08:32.11

1ab.ext        12/12/09   08:32.11

| Clip 2 |
|---|

| Clip 2_1 |
|---|

2_1aa.ext     12/12/09   08:32.11

2_1ab.ext     01/07/10   16:45.76

| Clip 2_2 |
|---|

2_2aa.ext     02/02/10   05:31.22

2_2ab.ext     12/12/09   08:32.11

FIG. 4

TAPE DATA MANAGEMENT

CROSS REFERENCE TO RELATED APPLICATIONS

This application claims the benefit of the filing date of U.S. Provisional Application No. 61/411,816, filed Nov. 9, 2010, entitled "Tape Data Management," the disclosure of which is incorporated by reference.

BACKGROUND

The present invention relates generally to systems and methods for managing data with respect to tape storage, and more particularly to managing data with respect to data stored on tapes in a manner that supports a file system.

The rapid expansion in the use of digital media and the ease of communication using such have significantly increased the amount of data that media companies create and manage. More than ever, media companies desire to not only quickly generate such digital media but also quickly access, modify, and proliferate such data. This grand expansion in digital data has also seen a shift in the professional media community from recording on traditional film and tape to recording directly to digital media files. This trend has numerous advantages in speeding up the process of the shooting, editing and generally the creation of the movies, television and news programs. However, the tremendous amount of data may be difficult to preserve, edit, and access.

SUMMARY OF INVENTION

In accordance with an embodiment of the present invention, a system for providing tape data management is provided. In one aspect, the invention provides a method, performed by a computer, for storing information on tape, comprising: receiving stored files and information of a modification time of each of the stored files; commanding writing of the stored files to tape; writing a proxy file for each of the stored files to memory, each proxy file including an indication of the modification time of the corresponding stored file; and commanding writing of the proxy files to tape.

In another aspect, the invention provides a system for data management, comprising: a processor to receive metadata related to source content and extract information from the metadata to determine a data structure for storage of the source content; a server, coupled to data manager via a network connection, to receive from the processor the metadata and the data structure for storage of the source content and to receive the source content from a client and to execute instructions to cause the content data to be written to a formatted tape media of a tape device coupled thereto.

In another aspect, the invention provides a computer implemented method for managing data, comprising: receiving via a server, content data and metadata information, the content data being directly provided from a content data source; initializing a proxy file system; executing instructions to cause the content data, write sequence information and the proxy file system to be sequentially written to a formatted tape media.

In another aspect, the invention provides a computer implemented method for restoring content data from a tape, the method comprising: retrieving, from a formatted tape including content data, a binary file, the binary file including instructions which when executed cause a processor to: read directory structure information from the tape; and restore the content data included on the tape to a predetermined target location.

In another aspect, the invention provides a computer implemented method for self-verification of content data on a tape media, the method comprising: retrieving, from a formatted tape including content data, a binary file, the binary file including instructions which when executed cause a processor to: perform a checksum on the content data on the tape; compare the checksum with a correct checksum stored on the tape; provide an indication of a data verification result.

In another aspect, the invention provides a computer implemented method for generating a preview of content data stored on a tape storage medium, the method comprising: receiving content data from a source to be written to a tape storage medium; extracting metadata from the content data and using the metadata to generate a proxy data structure; copying a file included in the source content data and storing the copied file in the proxy data structure; writing the source content data to the tape storage medium; storing the proxy data structure in a storage device of a production station; accessing, via the production station, a file of the proxy data structure to generate a preview of a corresponding source file of the content data written to tape.

Other features and aspects of the invention will become apparent from the following detailed description, taken in conjunction with the accompanying drawings which illustrate, by way of example, the features in accordance with embodiments of the invention. The summary is not intended to limit the scope of the invention.

DESCRIPTION OF THE DRAWINGS

FIG. 4 is a diagram illustrating a tape file system in accordance with aspects of the present invention;

DETAILED DESCRIPTION

Figure 1:
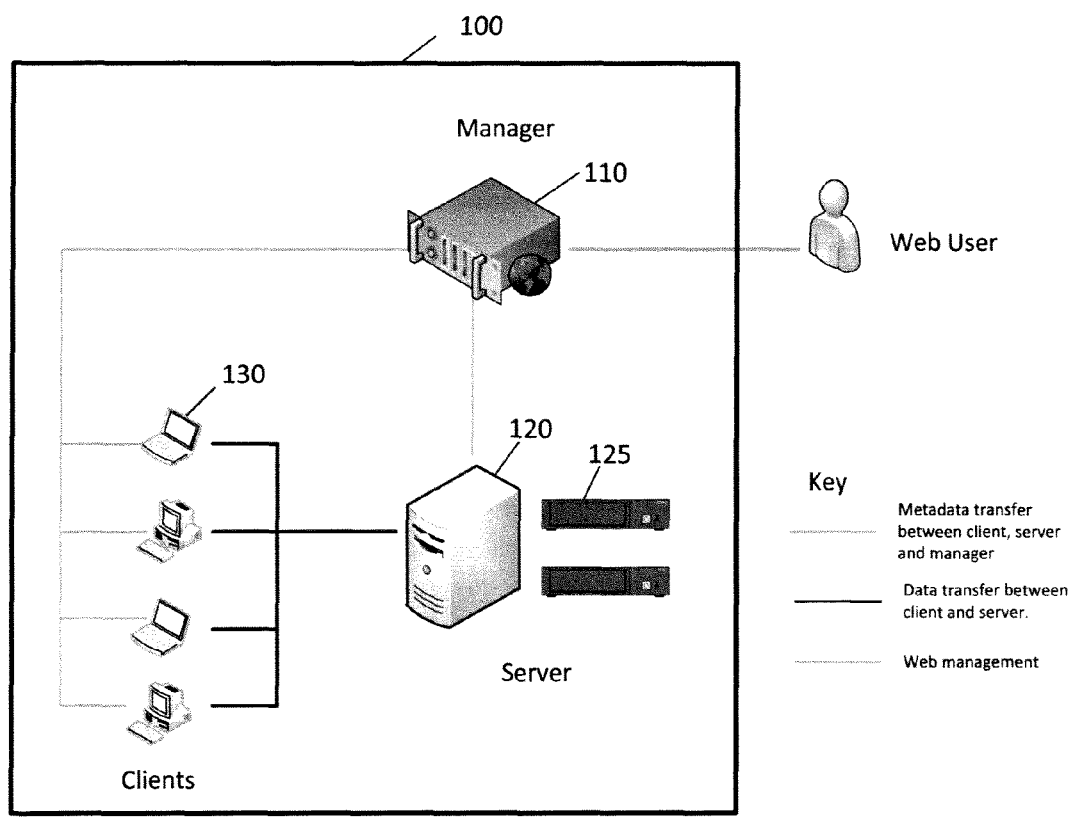
FIG. 1 is a diagram illustrating a tape data management system in accordance with aspects of the present invention.

FIG. 1 is a diagram illustrating a tape data management system in accordance with aspects of the present invention. Referring to FIG. 1, a tape data management system 100 includes a server 120 coupled to at least one tape drive 125 and at least one client 130, with a plurality of tape drives and a plurality of clients as illustrated in FIG. 1. The server may be directly connected to the tape device via a high speed connection, such as fibre channel or serial attached SCSI (SAS) for example. Alternatively, the server may be connected to the tape device via a network, such as a storage area network (SAN). The tape drives preferably include capability for a file system such as a linear tape file system (LTFS) for example. In some embodiments, the content may be written to an LTFS formatted LTO-5 tape. Other tape types may alternatively be used in various embodiments. The clients may be coupled to the server by way of a local area network or a wide area network, and may be or execute on personal computers or other workstations or other computer devices. In some embodiments, a tape drive may be coupled to a client device with the client commanding tape drive operation, and in such embodiments, the client device may perform functions ascribed to the server herein.

The server commands the tape drives to write data to and read data from tapes in the tape drives, also generates additional information regarding data written to the tapes, with the additional information in some embodiments also written to the tapes as well. The additional information includes, in most embodiments, modification time information indicating a modification time of source data written to the tapes. In some embodiments the additional information includes various items of metadata regarding the data written to the tapes.

In some embodiments, the source data is in the form of files, and the additional information is stored in the form of a proxy file system, with a proxy file for each file written to tape. The proxy file may include, or otherwise have associated with the file, information that indicates a time of modification of the source file. The proxy file may also include other information, such as image information (in some embodiments at a lower resolution than mage information of the source file written to tape), format information, creator information, project information, or other information. In addition, in some embodiments, proxy files are maintained in a directory structure matching, or corresponding, to a directory structure in which the source files are stored on the tape or stored on a source memory device. In such an arrangement, the proxy files and associated directory structure may be considered a proxy file system.

As illustrated in FIG. 1, the system includes a data manager 110, which is optional in various embodiments. The data manager may serve as a central policy manager and be comprised of a central database, a web engine, and policy code. The clients and server register with the data manager. The data manager monitors connectivity with the clients and server using for example periodic signal, such as a signal that may be referred to as a heartbeat signal. In some embodiments, the data manager may synchronize a job or data transfer that is executing on a server, a client system or both. Further, the data manager may provide a web interface to enable users to add, edit, view and monitor data transfer jobs remotely.

When source content is to be written to tape, the source content metadata may extracted and provided to the data manager. In some embodiments, the source content metadata is not processed by the server, instead the data manager is configured to intelligently read the metadata. That is, the data manager parses the metadata to determine the file structure of the content data. The data manager stores the extracted metadata and provides a copy to a server that will conduct the data backup of the source content. In other embodiments, the server is instead configured to determine and/or generate the metadata, and place the metadata for example in the form of a proxy file system, which the server may provide to the data manager. Provision of the proxy file system to the data manager is beneficial in that potentially the clients, or other servers, may access the information of the proxy file system from the data manager.

Figure 2:
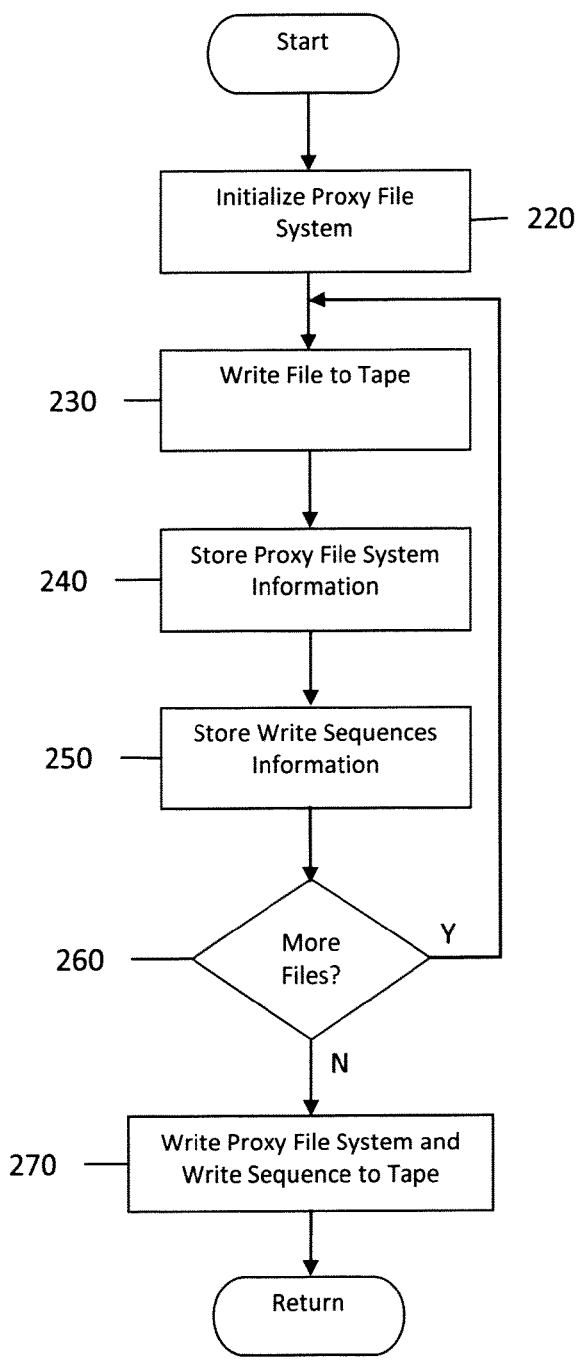
FIG. 2 is a diagram illustrating a process for tape data management in accordance with aspects of the present invention.

FIG. 2 is a flow diagram illustrating a process in accordance with aspects of the present invention. In some embodiments the process of FIG. 2 is performed by the server of FIG. 1. In some embodiments, a client of FIG. 1 performs the process of FIG. 2, for example if the client is coupled to a tape drive instead of or in addition to the server. At block 210, the process starts. At block 220, the process initializes a proxy file system, which may be a proxy file system as discussed with respect to FIG. 1. In some embodiments, the proxy file system is initialized to include a file for each of the files to be written to tape, with in some embodiments, the files arranged in a directory structure mirroring a directory structure by which the files are to be accessible or visible on the tape. In some embodiments, the proxy file system may be constructed to include a mirror of the native data structure for the source content that is to be written to tape. In some embodiments, the proxy file system may be configured to only include a mirror of the source file structure At block 230, the process writes a file to tape. The writing operation preferably is accomplished in accordance with the Linear Tape File System (LTFS) Format Specification, for example version 1.0 or 2.0.0, the disclosures of both which are incorporated herein by reference for all purposes in their entirety, and both of which at the time of writing are publicly available from IBM.

The write operation may be performed via a local connection or via a network connection (e.g., LAN or WAN). In some embodiments, the system uses a very small and temporary disk cache. It uses this disk cache to perform the parallel sync used to achieve WAN optimization.

In some embodiments the system uses buffer resizing to calculate the size of the send and receive buffers. These buffers are tuned by using the available bandwidth and the latency between the source and target. The calculation for buffer sizes are described as follows:

Send buffer in Kbytes—Bandwidth (Kbytes/sec)*Round trip latency (secs)

Receive buffer is ½ the send buffer

In some embodiments, the system may use a retry algorithm. Since networks often drop connections that do not respond for an extended period of time, the system may be tuned to recognize this as normal and resends a sync request to ensure that a sync is proceeding. This may be useful in avoiding timeouts due to an extended tape seek, for example. In some embodiments, multiple retries maybe sent before determining that a connection has been lost and closing a connection.

At block 240, the process stores the proxy file system information. The process may store the proxy file system in memory associated with the server, though preferably not the tape as doing so may delay progress of writing of the source files to tape. For each file written to tape, a corresponding proxy file is generated. The proxy file includes the modification time of the file written to tape. In various embodiments the proxy file additionally includes attribute data related to the source file written to tape, such as, file size, extended attributes and metadata. In various embodiments the proxy includes some information of the source file, for example when the source file is an image the proxy file may additionally include an image of a lower resolution than the image of the source file.

In accordance with aspects of the present invention, the proxy file system may be stored on the data manager, the server, or a client system or a combination thereof. At block 250, the process stores write sequence information. The write sequence information is recorded and maintained so that the written content data may be read back in the same sequence that the source content data was written. As such, seek operations may be minimized and the speed at which the data may be read is increased.

Additional information including, for example, an archive history which includes a history of the content written to a tape may also be generated and stored. Where multiple tapes are used for an archive, the archive history may also include identification for the tapes used for the archive and the location directories each time content was synced to tape for the archive.

At 260, the process determines if there are more files to be transferred. If there are more files to be written, the process returns to block 230 and repeats. On the other hand, if there are no additional files to be written, at block 270, the process writes the proxy file system to tape and writes the write sequence information to tape. The proxy files system and write sequence information may also be written to disk on the data manager, the server, or a client system. As such, an indication of the contents of the tape, and in some embodiments information regarding or of the contents of the tape may be viewable and searchable from a remote system.

Figure 3:
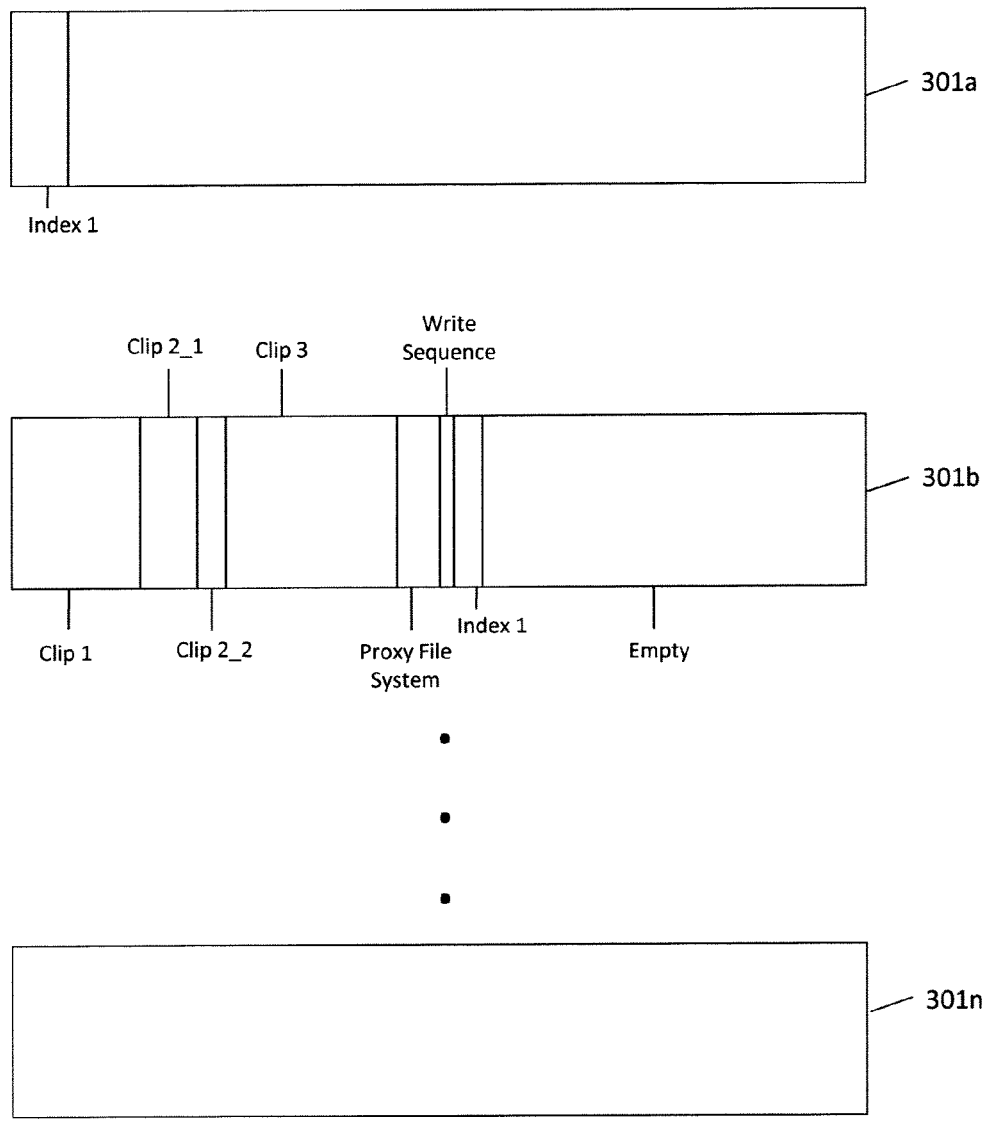
FIG. 3 is a diagram of a physical tape layout in accordance with aspects of the present invention.

FIG. 3 is a diagram illustrating a physical layout of a tape in accordance with aspects of the present invention. The tape includes a first wrap 301*a*, a second wrap 301*b*, and subsequent wraps to an end wrap 301*n*. As shown in FIG. 3, which is not to scale (and in which the left-hand portion may be considered a first end of the tape, a center portion an opposite second end of the tape, and the right hand portion a return to the first end of the tape), a first wrap of the tape (forming a first partition) includes an index, Index 1, of the contents of the subsequent wraps of the tape (forming a second partition). As illustrated in FIG. 3, the second wrap includes additional information, with files labeled Clip 1, Clip2_1, Clip 2_2 and Clip 3 written in succession on the tape. The files, for example, may have video clip information, and each file may be considered a video clip. The video clips are followed on the tape by proxy file system information, which may be stored in a single file or multiple files, and a file including write sequence information. When the proxy file system and write sequence data are maintained on disk during content mirroring, the content data, proxy file system and write sequence information may be included in sequential blocks on the tape. Accordingly, subsequent retrieval of the data on the tape may be optimally performed. The remaining tape is empty and available for subsequent data syncs.

In some embodiments, the data manager, server and/or client systems may be configured to execute instruction for generating and displaying a listing of files in a proxy file system displaying an image, for example.

FIG. 4 is a diagram illustrating an example file system listing for an example file system in accordance with aspects of the present invention. Referring to FIG. 4, the file system is organized in a directory structure. The directory structure includes a directory for content data included in a write sequence. Further, a subdirectory may be provided to capture incremental changes to the content data. The file system listing may also include additional information regarding the captured content data such as the date and time the content was created, modified and/or when the content was written to tape.

Figure 5:
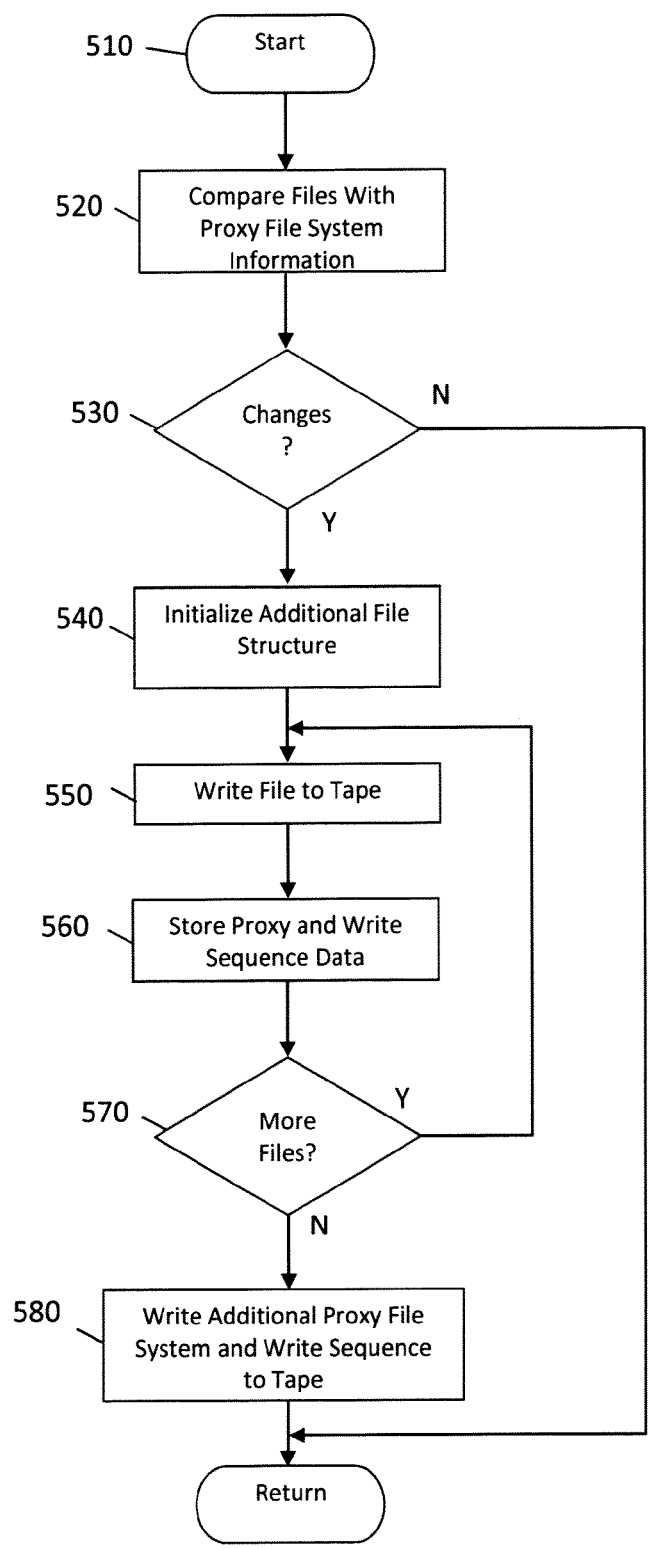
FIG. 5 is a diagram illustrating a process for tape data management in accordance with aspects of the present invention.

FIG. 5 is a flow diagram illustrating a process for updating information written to a data tape in accordance with aspects of the present invention. In some embodiments the process of FIG. 5 is performed by the server of FIG. 1. In some embodiments, a client of FIG. 1 performs the process of FIG. 5, for example if the client is coupled to a tape drive instead of or in addition to the server. At block 510, the process starts. At block 520, the process compares source file information with proxy file system information. This comparison determines whether any of the previously archived files have been modified since being written to tape or whether new files have been added. The comparison may be performed by the data manager, the server or a client system. In some embodiments, the comparison is performed using file modification time information of the source file and file modification time as indicated by the proxy file system.

At block 530, the process determines whether the changes have been made. When there have been no changes made to the files included in the proxy file system, the process terminates. Conversely, if the process determines that there are changes with respect to the source files, the process continues to block 540. At block 540, the process initializes an additional proxy file system. The proxy file system is, for example, as discussed with respect to block 220 of the process of FIG. 2, but only including any files and associated directory structure for changed or new files. At block 550, the process writes a changed or new source file to tape. At block 560, the process stores the proxy file system information and write sequence data, for example as discussed with respect to block 240 of the process of FIG. 2. At block 570, the process determines if there are more changed or new files to be written to tape. If there are more files to be written to tape, the process returns to block 550 to continue writing the additional files to tape and storing the proxy and write sequence data. When there are no more files to be written to tape, at block 580, the process writes the additional proxy file structure and write sequence information to tape. At block 590, the process returns.

Figure 6:
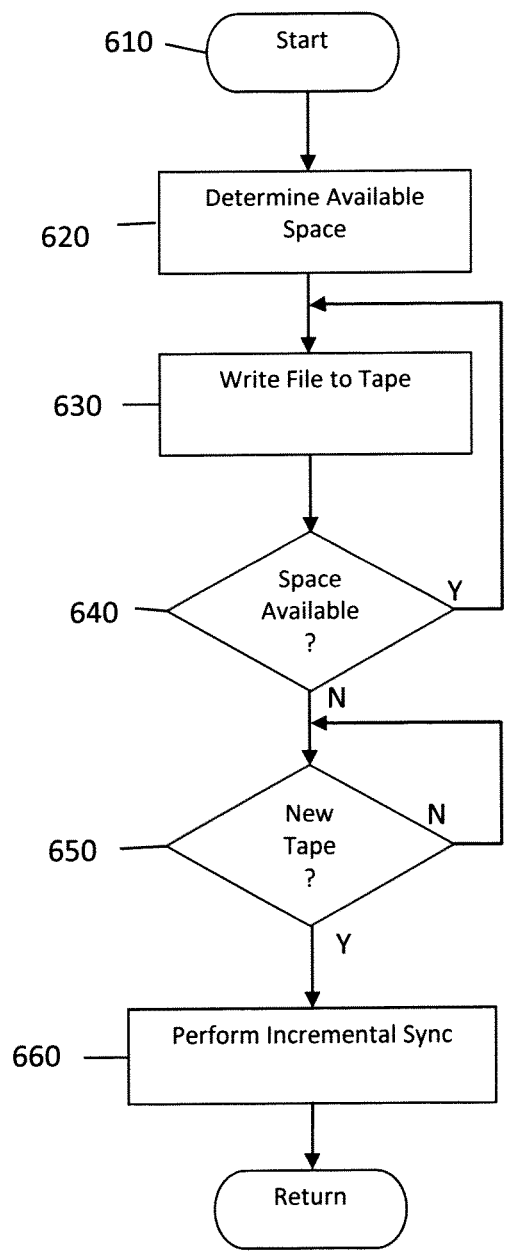
FIG. 6 is a flow diagram illustrating a process for syncing data over multiple tapes in accordance with aspects of the present invention.

FIG. 6 is a flow diagram illustrating a process for syncing data over multiple tapes. In some embodiments the process of FIG. 6 is performed by the server of FIG. 1. In some embodiments, a client of FIG. 1 performs the process of FIG. 6, for example if the client is coupled to a tape drive instead of or in addition to the server. At block 610, the process starts. At block 620, the process determines the available space on a tape. At block 630, the process writes the file to tape. At block 640, the process checks whether space is available to continue writing. If there is space available, the process continues, repeating the steps of writing the next file to tape and checking space availability. When there is no more space available on the tape for writing, the process closes the sync and at block 650 checks whether a new tape has been installed. If a new tape has not been installed, the process will wait and repeatedly check for a new tape. When a new tape is installed, at block 660, the process performs an incremental sync, for example using the process of FIG. 5, to write the remaining files to tape.

In some embodiments, the process of checking for changed files, initializing additional proxy file system and writing the additional files to tape as described above with respect to blocks 530, 540, and 550, may be continually executed as a background process performed by the server, data manager or a client to enable continuous syncing of the content data. This is advantageous because, further reduces the potential for lost content and also reduces downtime related to system data backups.

In some embodiments, the process may retrieve information regarding the writable space remaining on the tape. The process may determine an amount of information to be written to tape. If there is sufficient space to complete the backup, the process writes the information and closes the sync. If there is not sufficient space, the process determines a first portion of the data to be written that will fit in the remaining writeable space of the tape and writes this portion of information. The process may wait for an additional tape to be installed in a tape device to continue writing the remaining portion of the information to be written.

Figure 7:
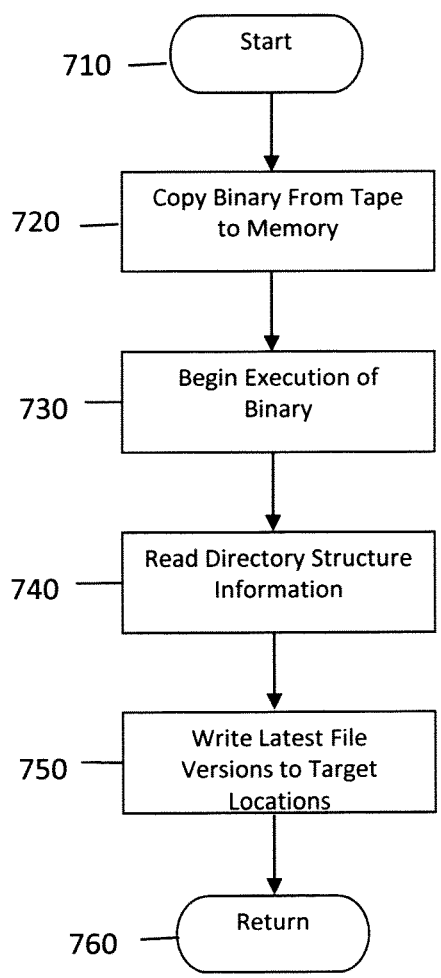
FIG. 7 is a flow diagram illustrating a process for recovering, or restoring, information on a tape using an executable program stored on the tape itself in accordance with aspects of the present invention.

FIG. 7 is a flow diagram illustrating a process for recovering, or restoring, information on a tape using an executable program stored on the tape itself. In some embodiments the process of FIG. 7 is performed by the server of FIG. 1. In some embodiments, a client of FIG. 1 performs the process of FIG. 7, for example if the client is coupled to a tape drive instead of or in addition to the server. The program, for example, is an executable program in binary form, and the program may be executed, again for example, by the server of FIG. 1. As the program is preferably stored on the tape in binary form, the program may be considered a self-restoring binary for the tape.

The self restoring binary manages the process of efficiently recreating the point in time from the tape to the target disk. The self-restoring binary allows for both partial files and full snaphot recovery and also uses the write sequence to enable highly efficient reads directly from tape. The self restoring binary may be stored on the main LTFS volume, for example in partition 0, and may be visible when the mounted. Further, the binary may be stored in the root location under a hidden folder called .xxx_self_restore or other location and/or name according to user preference.

Referring to FIG. 7, the process starts at block 710. At block 720, the process copies a binary from tape to memory. At block 730, the process begins execution of the binary. The binary may request a user to specify a target location for the restored content or use a predetermined target location. At block 740, the process reads the directory structure information. The process may read an archive history to determine the location of content included in the archive and whether the archive spans multiple tapes. The directory information may further include write sequence information and proxy file system information. At block 750, the process writes the latest file versions to target locations. In some embodiments, the binary determines latest versions of files on the tape by accessing proxy file information stored on the tape. In some embodiments, the binary uses an overlay approach and syncs the latest content from tape to a target and applies the correct modified times which may be retrieved from the proxy file system included on the tape, to the restored content. At block 760, the process returns.

When the archive spans multiple tapes, the process may restore content from a first tape and prompt the user to insert subsequent tapes and continue the restore content to a target location until the entire archive is restored.

Figure 8:
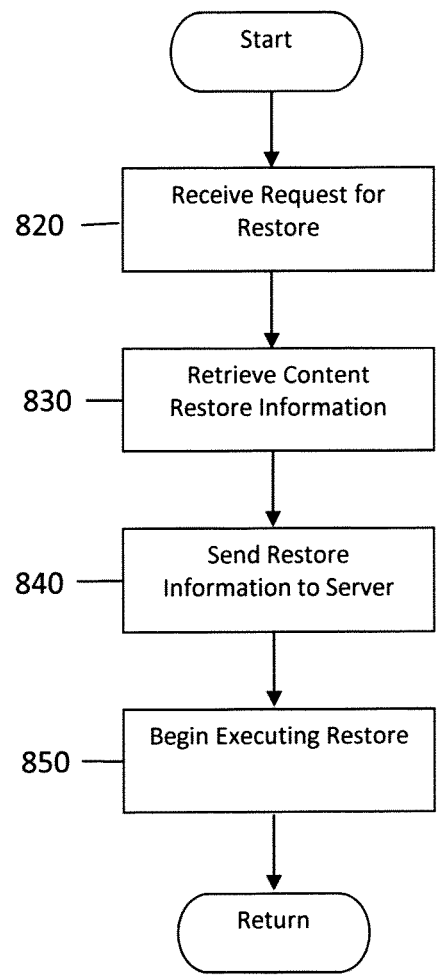
FIG. 8 is a flow diagram illustrating a process for remotely restoring content from a tape in accordance with aspects of the present invention.

FIG. 8 is a flow diagram illustrating a process for remotely restoring content from a tape in accordance with aspects of the present invention. The process may be performed by systems, or portions thereof, described herein. The process starts at block 810. At block 820, the process receives a request to restore content from tape. At block 830, the process determines a location for the backup. In one embodiment, restore information may be retrieved from the data manager. The restore information may include, for example, a serial number for the tape(s) used in creating the archive, the location of such tapes, a target location for restoring the content, the metadata, and proxy file system. At block 840, the process sends the restore information to a server coupled to the tape device to be used in conducting the restore. At block 850, the process begins executing the restore. The content to be restored from tape need not be sent to the data manager, but rather may be sent directly to the target location. When the content has been restored, the process returns at block 860.

Figure 9:
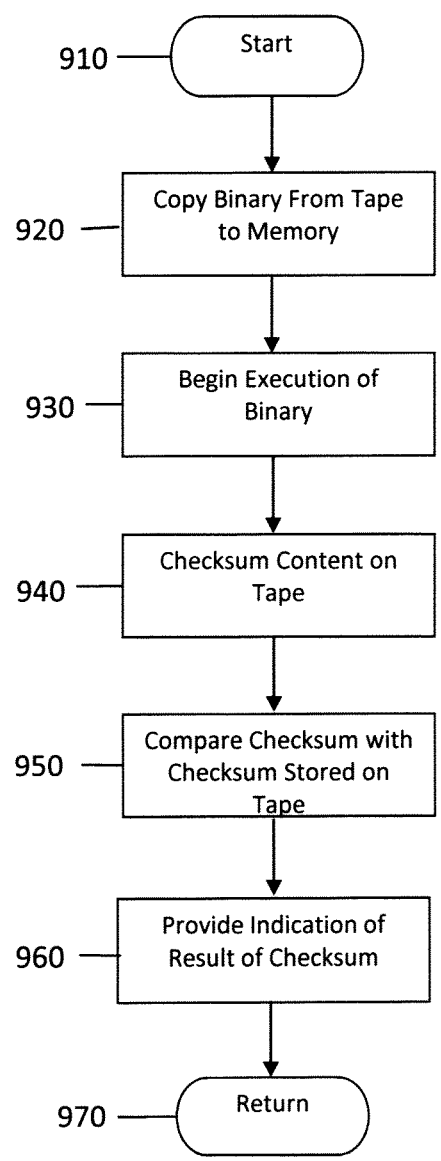
FIG. 9 is a flow diagram illustrating a process for performing a self verification of the contents of tape media in accordance with aspects of the present invention.

FIG. 9 is a flow diagram illustrating a process for performing a self verification of the contents of tape media in accordance with aspects of the present invention. In some embodiments the process of FIG. 9 is performed by the server of FIG. 1. In some embodiments, a client of FIG. 1 performs the process of FIG. 9, for example if the client is coupled to a tape drive instead of or in addition to the server. When content is synced to tape, a checksum of select data blocks may be stored in an XML. In some embodiments a spot checksum may be used to improve process performance. In addition, the checksum may be stored in an encrypted form for security purposes.

Referring to FIG. 9, the process starts at block 910. At block 920, the process copies binary from tape to memory. At block 930, the process begins execution of the binary. At block 940, the process performs a checksum on the content on the tape. At block 950, the process compares the checksum with the checksum information stored on tape. At block 960, the process provides an indication of the result of the checksum comparison. At block 970, the process returns.

The data management systems and methods described above are broadly applicable to many media environments. Media environments are quickly transitioning to a file based workflow—from capture, to post production, exchange and distribution. A large number of production pipelines now utilize file based cameras that generate terabytes of file based video files rather than traditional video tapes.

Figure 10:
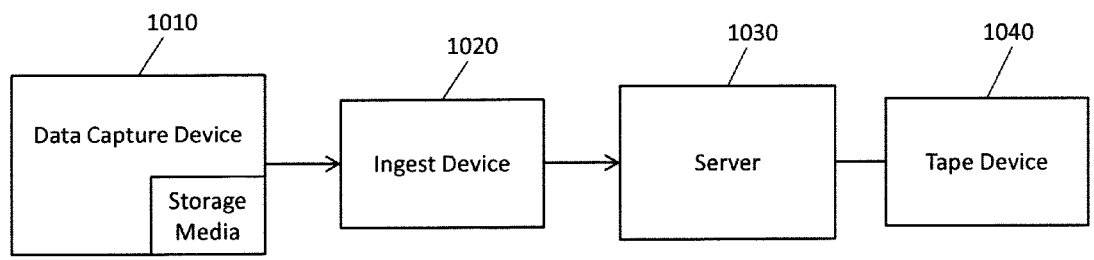
FIG. 10 is a diagram of a production pipeline for capturing and storing content in accordance with aspects of the present invention.

FIG. 10 is a diagram of a production pipeline for capturing and storing content in accordance with aspects of the present invention. The production pipeline may include a capture device 1010 including a data storage media, an ingest device 1020, a server 1030 and a tape device 1040. The capture device may be a video camera, digital tape recorder or other media recording device. The data storage media may be a hard drive, flash drive or other data storage device. The ingest device receives the content stored on the data storage media and transmits the data to a server. The content data may be received in various formats on a storage media, including, but not limited to, flash card, memory stick, compact disc, DVD, Blu-ray, or hard drive. The server may extract metadata related to the content to determine the data structure. The server may send the content data and related information (e.g., metadata, write sequence), to the tape device which may then write the content data and related information to a tape. In some embodiments, a checksum may be performed on the source content and the checksum output may be written to tape along with the content data. In some embodiments, the checksum may be performed while the content is being written to tape. In some embodiments, a second copy of the tape archive may be made and stored at a remote site for disaster recovery purposes.

Figure 11:
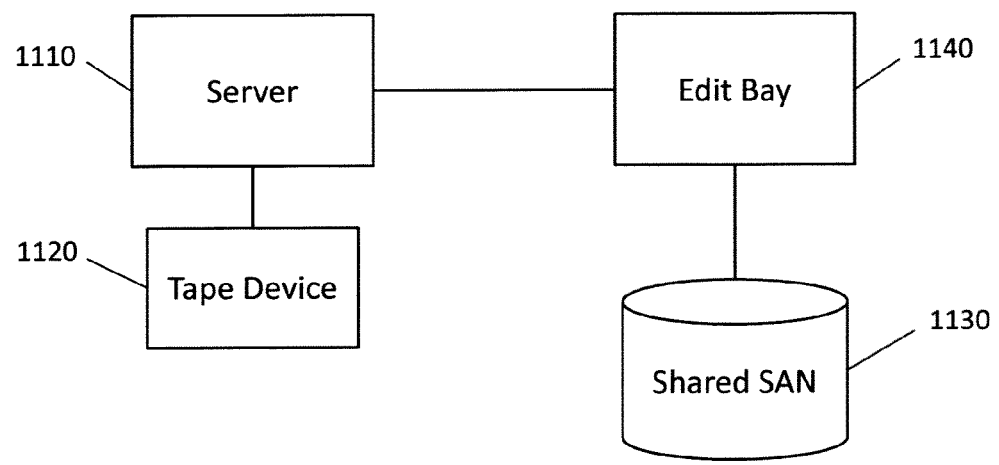
FIG. 11 is a diagram of a post production pipeline in accordance with aspects of the present invention.

FIG. 11 is a diagram of a post production pipeline in accordance with aspects of the present invention. As shown in FIG. 11, content data captured in the field may be provided to server 1110 and stored on a tape device 1120 coupled thereto. In traditional systems, the content would have to be re-ingested into edit applications before the content could be browsed. However, since the contents are stored on LTFS formatted tapes, the content may be directly accessed and browsed.

The content may be edited directly from the tape using an editing application or may alternatively be restored, as previously described, to a primary storage device such as a hard disk or a shared storage area network 1130 for editing. After the content has been edited, the content data may be offloaded and archived to tape.

Figure 12:
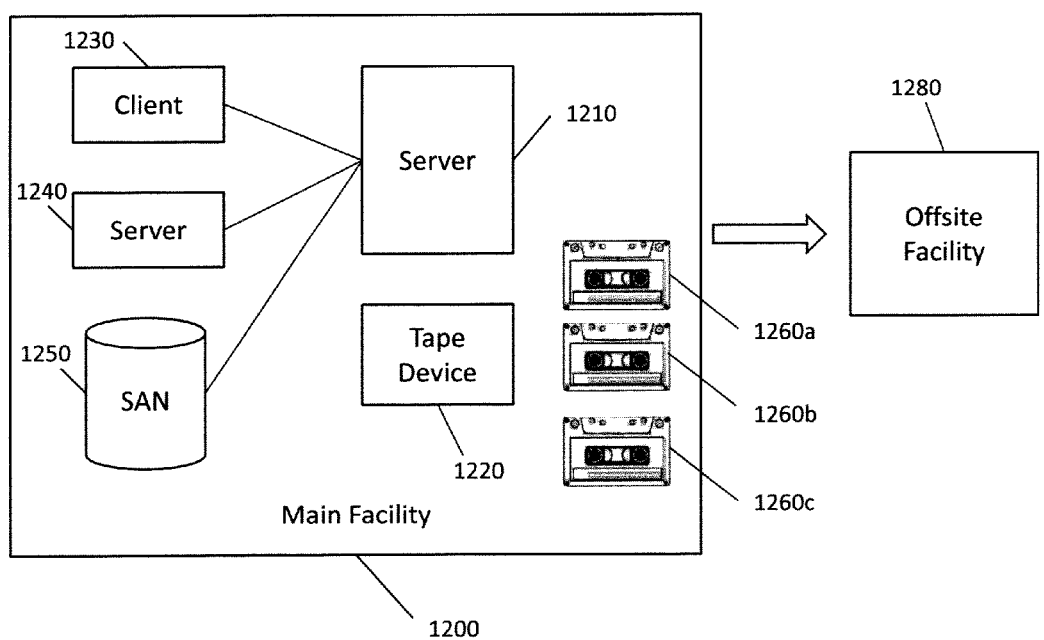
FIGS. 12 and 13 are block diagrams illustrating systems in accordance with aspects of the present invention.
Figure 13:
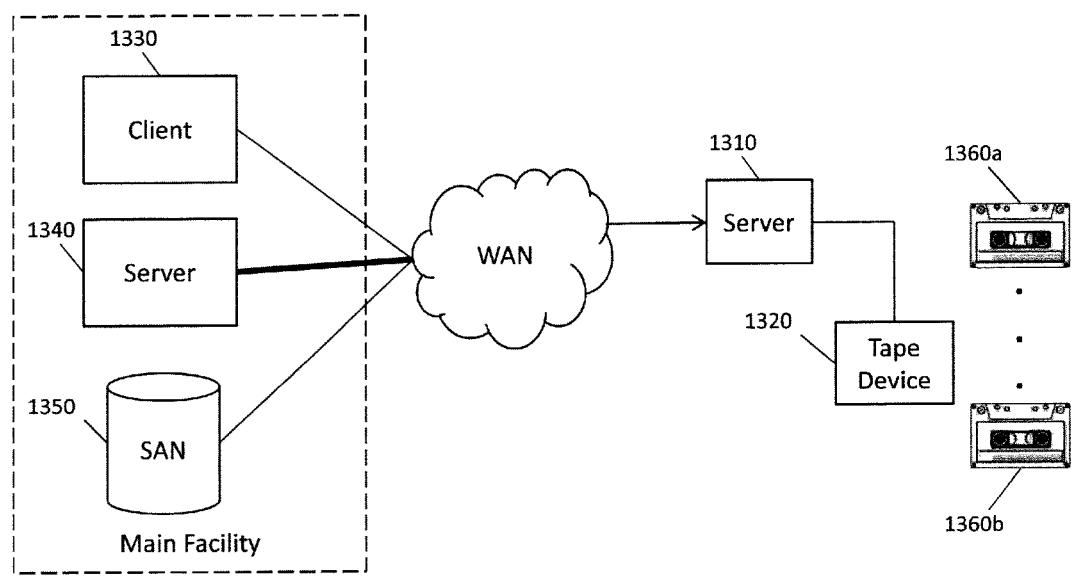

During the editing process, the system enables editors to check-in and share their work-in-progress sequences and associated media. Editors may export their edited sequences using XML or Advanced Authoring Format (AAF) exports, for example. An incremental sync may be performed to archive any changes made to the content during the editing session. The exported sequence may thus be shared with other editors that may further modify the sequence, while maintaining the ability to easily revert to a prior version FIGS. 12 and 13 are block diagrams illustrating systems in accordance with aspects of the invention. Referring to FIG. 12, the system may include a server 1210, a tape device 1220, and an offsite facility 1280. The system may also include client systems 1230, additional server 1240 and data storage such as SAN 1250. As the clients and servers generate and edit content data, the content data may be quickly preserved and written to a tape or multiple tapes (e.g., 1260a, 1260b, 1260c) as discussed above in connection with FIGS. 1-6. For purposes of disaster recovery, these tapes may be sent offsite facility for storage. In the event of a disaster, including the loss of source content on any of the client or server systems, the tapes maintained offsite may be sent back to main facility and quickly restored without the aid of additional software as discussed above with respect to FIG. 7.

As shown in FIG. 13, a tape device may also be maintained offsite. The content data may be sent to a remote server via the Wide Area Network and then written to tape as discussed above with respect to FIGS. 1-6. In some embodiments, WAN acceleration techniques may be used to improve data transfer efficiency. WAN acceleration techniques may include, for example, the use of parallel data streams and/or buffer resizing. The tapes (e.g., 1360a. 1360b) created may be maintained at an offsite facility. Accordingly, in the event of a disaster, including the loss of source content on any of the client or server systems, the tapes maintained offsite may be sent back to main facility and quickly restored without the aid of additional software as discussed above with respect to FIG. 7.

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments, but should be defined only in accordance with the claims supported by this disclosure and their insubstantial variations.

The invention claimed is:

1. A method, performed by a computer, for storing information on tape, comprising:
   receiving stored files and information of a modification time of each of the stored files;
   commanding writing of the stored files to tape;
   writing a proxy file for each of the stored files to memory, each proxy file including an indication of the modification time of the stored file corresponding to the proxy file;
   commanding writing of the proxy files to tape;
   determining whether a stored file has a modification time later than a modification time indicated by a proxy file for the stored file; and
   commanding writing of the stored file to tape if the stored file has a modification time later than a modification time indicated by the proxy file for the stored file.

2. The method of claim 1, wherein at least some of the stored files include video information, and wherein proxy files for the stored files including video information include a version of the video information at a lower resolution than the resolution of the video information in the stored files.

3. The method of claim 1, wherein the proxy files are stored in a directory structure matching a directory structure for the received stored files.

4. The method of claim 1, wherein the proxy files are stored in a directory structure matching a directory structure for the stored files as written to tape.

5. The method of claim 1, further comprising writing a sequence to memory, the sequence indicating order in which stored files were written to tape, and commanding writing of the sequence to tape.

6. A system for data management, comprising:
   a processor to receive metadata related to source content and extract information from the metadata to determine a data structure for storage of the source content;
   a server, coupled to the processor via a network connection, to receive from the processor the metadata and the data structure for storage of the source content and to receive the source content from a client, to execute instructions to cause the content data to be written to a formatted tape media of a tape device coupled to the server and to update the content data in the formatted tape media based on a comparison performed using a modification time of the content data and a modification time indicated by a proxy file system for the content data.

7. The system of claim 6, wherein the source content is stored in a file system on the formatted tape media.

8. The system of claim 7, wherein the file system is a linear tape file system.

9. A computer implemented method for managing data, comprising:
   receiving via a server, content data and metadata information, the content data being directly provided from a content data source;
   initializing a proxy file system;
   executing instructions to cause the content data, write sequence information and the proxy file system to be sequentially written to a formatted tape media.

10. The computer implemented method of claim 9, wherein the tape media is formatted to provide a linear tape file system.

11. The computer implemented method of claim 9, wherein the content data source is a client coupled to the server via a network.

12. The computer implemented method of claim 9, wherein the content data source is a storage area network coupled to the server.

* * * * *